US006941703B2

(12) United States Patent
MacLean et al.

(10) Patent No.: US 6,941,703 B2
(45) Date of Patent: Sep. 13, 2005

(54) SELF-CLEANING FLOORING SYSTEM (75) Inventors: James G. MacLean, La Quinta, CA (US); David L. Christian, Palm Springs, CA (US); Darell J. Long, Jr., Balboa, CA (US)

(73) Assignee: Sani-Floor, Incorporated, La Quinta, CA (US)

( * ) Notice: Subject to any disclaimer, the term of this patent is extended or adjusted under 35 U.S.C. 154(b) by 15 days.

(21) Appl. No.: 10/282,393

(22) Filed: Oct. 29, 2002

(65) Prior Publication Data

US 2004/0079040 A1 Apr. 29, 2004

(51) Int. Cl.[7] ............................................. A47K 3/16
(52) U.S. Cl. ................... 52/34; 4/146; 4/251.1; 4/612; 4/613; 4/614; 52/35; 137/312; 137/561 R; 137/602; 220/573; 604/356
(58) Field of Search ................... 4/146, 251.1, 612, 4/614; 52/34–35; 137/312, 561 R, 602; 220/573; 604/356

(56) References Cited

U.S. PATENT DOCUMENTS

| 4,198,715 | A | * | 4/1980 | Daniels | 4/146 |
| 4,512,044 | A | | 4/1985 | Clark | |
| 4,541,132 | A | * | 9/1985 | Long | 4/614 |
| 5,299,330 | A | * | 4/1994 | Moore et al. | 4/604 |
| 5,452,739 | A | * | 9/1995 | Mustee et al. | 137/312 |
| 5,775,869 | A | * | 7/1998 | Bishop | 414/608 |
| 6,003,169 | A | * | 12/1999 | Davis, Jr. | 4/613 |
| 6,058,659 | A | * | 5/2000 | Astrom | 42/34 |
| 6,102,073 | A | * | 8/2000 | Williams | 137/602 |
| 6,116,266 | A | * | 9/2000 | Dickinson et al. | 137/312 |
| 6,141,803 | A | | 11/2000 | Dunphy et al. | |
| 6,173,856 | B1 | * | 1/2001 | Bierce et al. | 220/573 |
| 6,202,689 | B1 | * | 3/2001 | Williams | 137/602 |
| 6,290,143 | B1 | * | 9/2001 | Vincent et al. | 238/2 |

* cited by examiner

Primary Examiner—Carl D. Friedman
Assistant Examiner—Yvonne M. Horton
(74) Attorney, Agent, or Firm—Stetina Brunda Garred & Brucker (57) ABSTRACT A self-cleaning flooring system for catching waste products has at least one module comprising a drain pan and a floor grid. The drain pan has a ramp and a central drain outlet. The ramp extends around the drain pan defining a drain pan periphery. The ramp slopes downward from the drain pan periphery towards the drain outlet. The drain pan periphery has a plurality of discharge ports spaced therealong for discharge of flushing fluid onto the ramp such that the waste products are washed down the ramp towards the drain outlet. The floor grid extends across the drain pan and is mounted upon the drain pan periphery for supporting personnel standing thereon while permitting waste products to pass therethrough. The module is interconnectable to horizontally adjacent modules to form the flooring system.

28 Claims, 4 Drawing Sheets

SELF-CLEANING FLOORING SYSTEM

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to flooring protection and, more particularly, to a self-cleaning flooring system having modules which are interconnectable to horizontally adjacent modules to form a continuous flooring system for catching waste products in a food preparation facility.

In the food preparation industry, sanitation and cleanliness is a major concern. The kitchen flooring in restaurants, hotels, institutions, and commercial food vending facilities in general is subject to frequent spillage from waste products. Such waste products may be in the form of spilled liquids, semi-solids, and small solids and may include grease, oil, water, and an infinite variety of food products. Spilled waste products may create a sanitation hazard as a hot kitchen is a natural breeding ground for harmful bacteria that may be caught in tile grout, and around pipes, drains or other kitchen fixtures. Because of the immovable nature of such kitchen fixtures, cleanliness is difficult if not impossible to maintain. Stringent health codes in most states require that kitchens in commercial food vending facilities receive daily cleaning. Daily cleaning of walls, counter tops, appliances and floors involves a great deal of hand labor consuming a considerable amount of time. In addition, the waste products may create a health hazard in that spilled food products are often wet or sticky, creating a high risk that kitchen personnel may be injured in a fall. Furthermore, spilled grease or oil creates a fire safety hazard requiring the cessation of all operations in the kitchen until the grease or oil is removed from the floor. As may be expected, shutting down all kitchen operations in a restaurant or hotel may result in a significant loss of revenue.

There is currently known in the prior art flooring systems that are configured to address sanitation and safety concerns. One prior art device comprises a washable floor for collecting waste. The device provides a grid or mesh on which a person may stand, the grid mounted above a sub-floor onto which waste falls. The sub-floor is downward sloping towards a drain outlet. Flushing means are provided for flushing the fluid waste down the sub-floor towards the drain outlet. The grid is pivotally movable between a horizontal position and a vertical position and is removable to facilitate maintenance. Although the device addresses a few safety and sanitation issues mentioned above in that it provides a disposal means for fluid waste, the device lacks installation flexibility in that it must be custom fitted to a particular floor configuration. In addition, the size of the grids and sub-floor are such that these components are too heavy and too large to be individually washed, either by hand or by mechanical means, such as in a commercial dishwasher.

Another prior art device provides a supporting surface for personnel standing thereupon. The device allows water or fluid to flow through the supporting surface and underneath a modular flooring member. The device includes a series of cross-channels forming a gridwork of fluid pads which permit water to flow underneath the modular flooring. However, a major drawback to the device is that a large portion of the subsurface of the flooring member is in direct contact with the moist support floor. Although this device addresses some safety concerns in that it provides a non-slip surface upon which personnel may stand, the device is subject to the problems of mildew and degradation of the subfloor arising from captured water. Furthermore, the device is not configured to be easily washable by hand or by mechanical means.

As can be seen, there exists a need in the art for a flooring system for catching waste products that also provides a non-slip surface upon which personnel may stand to reduce the risk of injury from slipping. Furthermore, there exists a need in the art for a flooring system that is self-cleaning in that waste products may be flushed toward a drain outlet for subsequent disposal. Additionally, there exists a need in the art for a flooring system that is light weight and of small size such that it is removable for easy cleaning by hand or within a commercial dishwasher. Finally, there exists a need in the art for a flooring system that is modular such that individual modules may be interconnected to cover a desired area such as a cooking line in a commercial kitchen.

SUMMARY OF THE INVENTION

The present invention specifically addresses and alleviates the above referenced deficiencies associated with the use of flooring systems. More particularly, the present invention is an improved self-cleaning flooring system for catching waste products that is modular and is configured such that it may be cleaned in a commercial dishwasher.

In accordance with an embodiment of the present invention, there is provided a self-cleaning flooring system for catching waste products. The flooring system of the present invention has at least one module comprised of a drain pan and a floor grid. The drain pan includes a drain channel, a pair of ramps, a pair of side walls and a pair of end walls. The ramps are disposed on either side of the drain channel and slope downward towards the drain channel. The drain channel is interposed between the side walls and extends between the end walls. The drain channel slopes downward from each end wall towards a central drain outlet. The side and end walls extend upwardly from the ramps and the drain channel, enclosing the drain pan. The side walls have a plurality of discharge ports for releasing flushing fluid onto the ramp such that waste products are washed down the ramp towards the drain channel.

The floor grid is configured to support personnel standing thereon while permitting waste products to pass therethrough. The side wall may include a hollow passage and at least one fluid inlet such that flushing fluid may be delivered to the discharge ports. The fluid inlet ports also allow for the flushing fluid to flow between adjacent modules. The endmost module in a flooring system is connectable to the flushing fluid source. The fluid inlet may be connected to a water supply wherein water is delivered to the hollow passage as the flushing fluid. An overflow passage may be provided near the drain channel for allowing the flow of flushing fluid and/or liquid waste products between adjacent modules. The floor grid may comprise a plurality of abutting floor grids disposed parallel to each other. The floor grids are sized such that the length of the module matches the overall length of the abutting floor grids. The module may include a plurality of dowels with the side walls having complimentary apertures sized for receiving the dowels for interconnecting horizontally adjacent modules.

In operation, the desired number of drain pans are assembled horizontally and joined using dowels or similar means. The fluid inlets are connected to the flushing fluid source. Channel stringers and drain baskets are installed if desired. Floor grids are then installed onto the drain pan. During use, the flushing fluid flows from the fluid inlets into the hollow passages. The flushing fluid may be provided on a periodic basis through the use of a timed control valve. Alternately, the flushing fluid may be manually provided as desired when the accumulation of waste products on the ramps reaches a critical level. Additionally, a thermal sensor may operate to provide the flushing fluid to the fluid inlet in the case of a fire. The flushing fluid may be in the form of water from a tap water source, and is discharged out of the discharge ports. Waste products that fall through the floor grid are washed by the flushing fluid toward the drain channel.

BRIEF DESCRIPTION OF THE DRAWINGS

These as well as other features of the present invention will become more apparent upon reference to the drawings wherein.

DETAILED DESCRIPTION OF THE INVENTION

Figure 1:
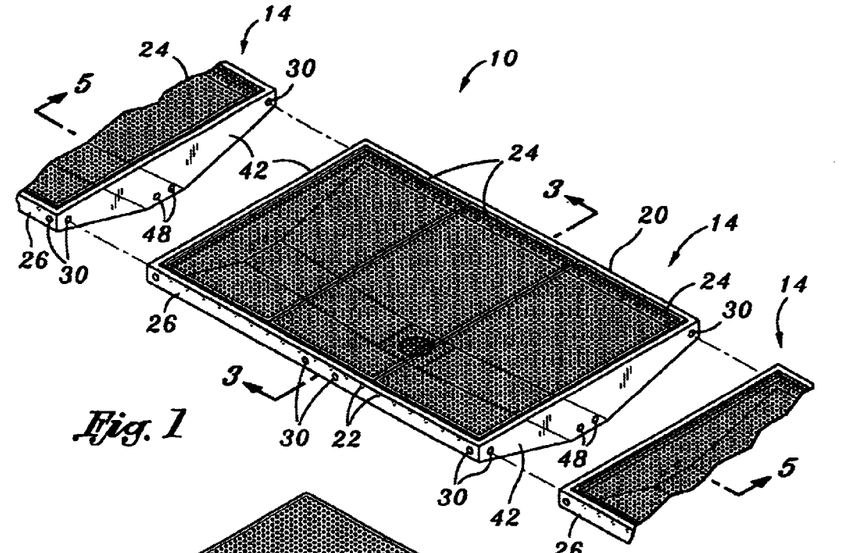
FIG. 1 is a perspective view of a first preferred embodiment of a flooring system illustrating the connective relationship of horizontally adjacent modules that may make up the flooring system.
Figure 2:
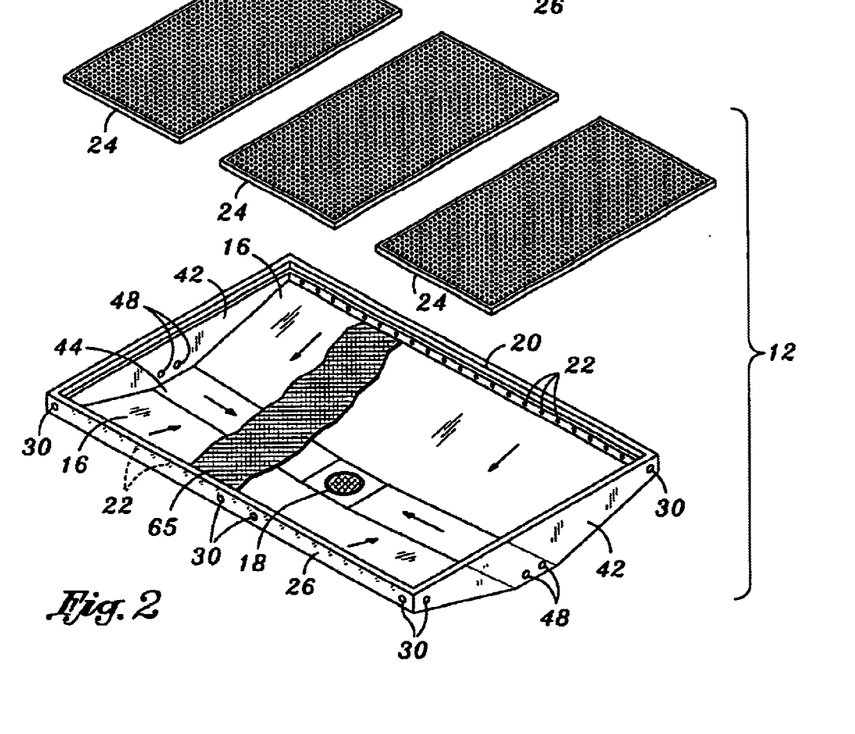
FIG. 2 is an exploded perspective view of the flooring system of FIG. 1 illustrating a module and the relationship of a drain pan and floor grids that make up the module of the first preferred embodiment.

The present invention will now be described in particular with reference to the accompanying drawings. FIGS. 1 and 2 show a module 12 of a first preferred embodiment of a flooring system 10 for catching waste products of the present invention. FIG. 1 is a perspective view of the first preferred embodiment of the flooring system 10 illustrating the connective relationship of horizontally adjacent modules 12 that make up the flooring system 10. FIG. 2 is an exploded perspective view of the flooring system 10 of FIG. 1 illustrating the module 12 and the relationship of a drain pan 14 and floor grids 24 that make up the module 12 of the first preferred embodiment. Although FIGS. 1 and 2 show the module 12 as having three floor grids 24 disposed upon the drain pan 14, it is contemplated that the module 12 may include at least one floor grid 24 covering the drain pan 14. The drain pan 14 is shown as having a rectangular shape although the drain pan 14 may be configured in a number of different shapes such that additional modules 12 may be interconnected thereto in a horizontally adjacent manner. For example, the drain pan 14 may have a square shape with the floor grid 24 sized and configured to match the shape of the drain pan 14.

Figures 3, 4, 5:
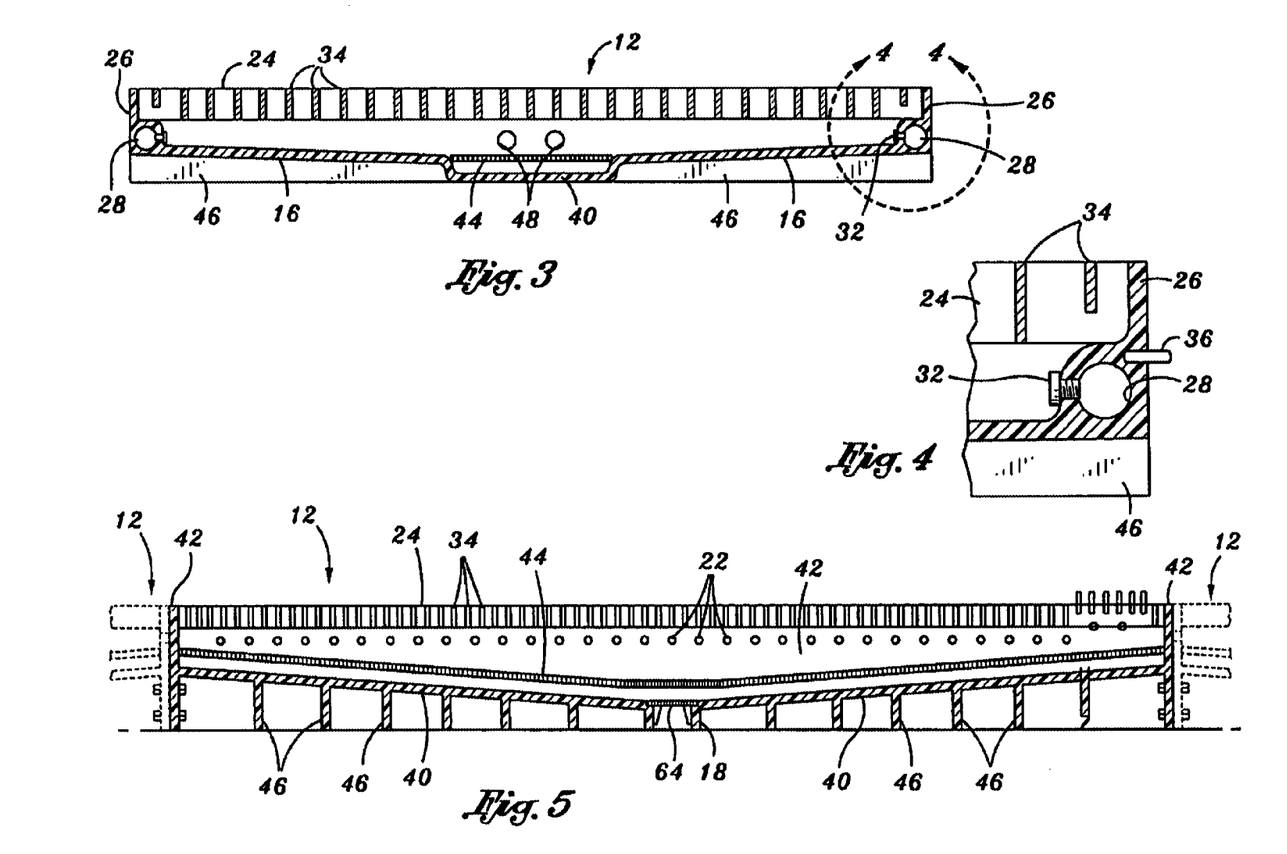
FIG. 3 is a longitudinal sectional view of the module taken along line 3—3 of FIG. 1 illustrating ramps sloping downward towards a drain channel.
FIG. 4 is an enlarged partial sectional view of the module taken from FIG. 3 illustrating the connective relationship of a spray nozzle disposed within a side wall of the module.
FIG. 5 is a transverse sectional view of the module of the first preferred embodiment taken along line 5—5 of FIG. 1 illustrating the drain channel sloping downward towards a central drain outlet.

In FIGS. 1 and 2, the drain pan 14 includes a drain channel 40, a pair of ramps 16, a pair of side walls 26 and a pair of end walls 42. The ramps 16 are disposed on either side of the drain channel 40 and slope downward from each side wall 26 towards the drain channel 40, as indicated by the arrows on the ramps 16 in FIG. 2. The drain channel 40 is interposed between the side walls 26 and extends between the end walls 42. The drain channel 40 includes a central drain outlet 18. The drain outlet 18 may be configured to accept a removable drain basket 64 for preventing solid or semi-solid waste products from passing through the drain outlet 18. Alternatively or in conjunction with the drain basket 64, an elongate, flat filtering mesh 65 may be utilized which preferably extends along the length of the drain channel 40 (shown only in FIG. 2. The drain channel 40 slopes downward from each end wall 42 towards the drain outlet 18, as indicated by the arrows on the drain channel 40. The side and end walls 26, 42 extend upwardly from the ramps 16 and the drain channel 40, enclosing the drain pan 14, with each side wall 26 having a plurality of discharge ports 22 for releasing flushing fluid onto the ramp 16 such that waste products are washed down the ramp 16 towards the drain channel 40. As was mentioned earlier, although three floor grids 24 are shown mounted on the drain pan 14, the module 12 may be comprised of at least one floor grid 24 extending between and mounted upon the side walls 26. The floor grid 24 is configured to support personnel standing thereon while permitting waste products to pass therethrough. Although shown having side walls 26, the module 12 may be comprised of a single ramp 16 that extends or wraps around the drain pan 14. In such an arrangement, the ramp 16 defines the drain pan periphery 20 from where it slopes downward towards the central drain outlet 18. The drain pan periphery 20 has a plurality of discharge ports 22 spaced therealong for discharging flushing fluid onto the ramp 16. The side wall 26 may include a hollow passage 28 and at least one fluid inlet 30, as can be seen in FIGS. 2 and 3. The hollow passage 28 is in fluid communication with the fluid inlet 30 such that flushing fluid may be delivered to the discharge ports 22.

Referring to FIG. 3, shown is a longitudinal sectional view of the module 12 taken along line 3—3 of FIG. 1 illustrating ramps 16 sloping downward towards the drain channel 40. As can be seen in FIG. 3, the fluid inlets 30 allow for the flushing fluid to flow between adjacent modules 12, with the endmost module 12 in a flooring system 10 connectable to the flushing fluid source. The fluid inlet 30 may be connected to a water supply wherein water is delivered to the hollow passage 28. The fluid inlets 30 may be disposed on the side walls 26 and may be concentric with the hollow passage 28. The hollow passage 28 may extend through the length of the side wall 26, or through only a portion of the side wall 26. The flushing fluid flows from the fluid inlet 30 into the hollow passage 28, exiting the discharge ports 22.

Turning now to FIG. 4, shown is an enlarged partial sectional view of the module 12 taken from FIG. 3 illustrating the connective relationship of a spray nozzle 32 within the side wall 26 of the module 12. The discharge ports 22 may be internally threaded for receiving spray nozzles 32 which may be included in the module 12, as can be seen in FIG. 4. The spray nozzles 32 may discharge the flushing fluid at an elevated pressure for improving the efficiency with which the waste products are washed down the ramp 16. The spray nozzles 32 may be conventional spray nozzles 32, or water jets. It is contemplated that the discharge of flushing fluid into the fluid inlet 30 may be manually activated. The discharge of flushing fluid may also be automatically activated with a timer that periodically provides a release of flushing fluid into the fluid inlet 30. In addition, it is contemplated that the spray nozzle 32 or water jets may be controlled by a thermal sensor such that flushing fluid may be discharged in case of fire. Regardless of the manner and timing of providing the flushing fluid, the waste products that have passed through the floor grid 24 and onto the ramp 16 are washed down the ramp 16 towards the drain outlet 18 with the flushing fluid. In the arrangement wherein the module 12 is comprised of a single ramp 16 surrounding a central drain outlet 18, the floor grid 24 extends across the drain pan 14 and is mounted upon the drain pan periphery 20. The drain pan 14 may include at least one side wall 26 extending upwardly from the drain pan periphery 20, the side wall 26 enclosing the drain pan 14. In this arrangement, the ramp 16 slopes downward from the side wall 26 towards the drain outlet 18 with the floor grid 24 being mounted upon the side wall 26. The discharge ports 22 are disposed within the side wall 26. Similar to the first preferred embodiment, the drain pan 14 may have a rectangular shape with the floor grid 24 sized to match the shape of the drain pan 14 such that the floor grid 24 is aligned with the drain pan 14 when disposed thereupon. In FIG. 2, the span between the end walls 42 defines a length of the module 12. As shown, the floor grid 24 may comprise a plurality of abutting floor grids 24 disposed parallel to each other. The floor grids 24 are sized such that the length of the module 12 matches the overall length of the abutting floor grids 24.

Referring to FIG. 3, the drain channel 40 is shown as being recessed between each ramp 16. An elongate channel stringer 44 may be disposed above the drain channel 40 between the ramps 16. The channel stringer 44 is configured to retain waste products thereon while allowing flushing fluid to pass therethrough into the drain channel 40. In this regard, the channel stringer 44 acts as a filter, preventing entry of solid and semi-solid waste products into the drain channel 40 while allowing flushing fluid and fluid waste products to pass thereinto. The channel stringer 44 may be removable to permit cleaning thereof and to access the drain channel 40 to remove accumulated waste products. At least one overflow passage 48 may be provided proximate the drain channel 40 for allowing the flow of flushing fluid and/or liquid waste products between adjacent modules 12. As can be seen in FIGS. 3 and 4, the hollow passage 28 may be integrally formed within the side wall 26 at the junction of the side wall 26 and the ramp 16. As is shown in FIG. 4, the hollow passage 28 supports the floor grid 24. The floor grid 24 lower peripheral edge may be chamfered or radiused or otherwise configured in order to provide a gap between the side wall 26 and the floor grid 24 such that waste products may pass therebetween. Also shown in FIG. 4 are dowels 36 protruding from the side wall 26. The module 12 may include a plurality of dowels 36. The side walls 26 may include complimentary apertures 38 sized and configured for receiving the dowels 36 for interconnecting horizontally adjacent modules 12 in a side-to-side manner. It is contemplated that the end walls 42 of the drain pan 14 may also be configured with complimentary apertures 38 sized and configured for receiving the dowels 36 such that modules 12 may be interconnected to horizontally adjacent modules 12 in an end-to-end manner. Alternate attachments for interconnecting adjacent modules 12 may be utilized such as mechanical fasteners, keys or setting flanges.

Referring to FIGS. 3 and 4, the modules 12 may further comprise parallel rib members 46 spaced along the length of the drain pan 14 between the end walls 42. The span between the side walls 26 defines a width of the module 12, the parallel rib members 46 being disposed widthwise under the ramps 16 and drain channel 40 for supporting the module 12 on a subfloor such as a tile and grout subfloor found in kitchens of many commercial food vending establishments. Such rib members 46 provide structural rigidity to the drain pan 14 as well as supporting the drain pan 14 in a level manner on the subfloor. The drain pan 14 may be formed of any suitable material including, but not limited to, stainless steel; a composite material and/or a polymeric material. It is contemplated that the polymeric material may be polyvinylchloride and/or polypropylene. Although the drain pan 14 may be formed of any material, it is contemplated that the drain pan 14 is formed of a material that is compatible with the elevated temperatures and dishwashing detergents that may be utilized in commercial dishwashers. The drain pan 14 may be formed as a unitary structure by injection molding. In this regard, the side walls 26, end walls 42, drain channel 40 and rib members 46 may be molded together as a single unit. In such a fabrication method, all corners may be radiused to reduce the chance of developing fatigue cracks induced by localized stresses in the corners. Furthermore, by providing radiused corners, cleaning of the unitary drain pan 14 is enhanced as waste products may be more easily removed therefrom during flushing of the drain pan 14 with the flushing fluid. The floor grids 24 may be also radiused complimentary to the radii in the drain pan 14 such that the floor grid 24 lower surface is in substantially abutting contact with the side wall 26 proximate the hollow orifice, as shown in FIG. 4.

Turning now to FIG. 5, shown is a transverse sectional view of the module 12 of the first preferred embodiment taken along line 5—5 of FIG. 1 illustrating the drain channel 40 sloping downward towards the drain outlet 18. In FIG. 5, the rib members 46 can be seen extending vertically downward from the ramps 16. The discharge ports 22 can be seen disposed within the side wall 26 extending along a length thereof. Although shown extending along the length of the side wall 26, it is contemplated that the discharge ports 22 may be evenly spaced between the end walls 42, along a portion of the side wall 26 or at varying spacings between individual discharge ports 22. The channel stringer 44 is shown disposed above the drain channel 40 extending from end wall 42 to end wall 42. The channel stringer 44 adds a further barrier against the entry of solid or semi-solid waste products into the drain outlet 18, reducing the risk of clogging or blocking the drain outlet 18. As a final measure of protection against the passage of solid or semi-solid waste products through the drain outlet 18, a removable drain basket 64 may be included in the drain outlet 18 with the drain channel 40 configured to support the drain basket 64.

In FIGS. 1, 2, 3, 4 and 5, the floor grids 24 are shown formed as an array of spaced parallel grid members 34 joined together with transversely disposed spaced grid members 34. The spacing of the grid members 34 may be such that the interstices between crossing grid members 34 is fine enough to allow passage of semi-solid and liquid waste products as well as flushing fluid. At the same time, the health of kitchen personnel may be considered in configuring the floor grids 24 such that the grid member 34 spacing provides the necessary comfort level to such personnel who may be standing upon the floor grids 24 at one location for extended periods of time, such as while cooking. As shown in FIG. 1, the floor grids 24 are configured to be removable for cleaning. The floor grids 24 are also sized and configured so that the width of the floor grid 24 approximately matches the width of the drain pan 14. The floor grids 24 may be formed of metallic or polymeric material. If formed of metal, it is contemplated that the floor grids 24 may be formed of perforated stainless steel. Optionally, the floor grids 24 may be formed of a fiber reinforced material such that the floor grids 24 are of light weight. It will be understood that the floor grids 24 may be formed of any material and be of any configuration such that they may support personnel standing thereon while allowing waste products to pass therethrough. Furthermore, it is contemplated that the material used in fabricating the floor grids 24 may be compatible for washing in commercial dishwashers at elevated temperatures.

The first preferred embodiment of the flooring system 10 may be of any size and shape. However, in order to facilitate cleaning of the drain pan 14 and the removable floor grids 24, it is contemplated that the width of the drain pan 14 be held to no more than thirty inches, which may be the maximum size that commercial conveyor type dishwashers may accommodate. Accordingly, the floor grids 24 may be restricted to a maximum of thirty inches in one direction. The length of the first preferred embodiment is contemplated to be about sixty inches. By restricting the length to sixty inches, the drain pan 14 may be small enough and of light weight to enable a single individual to lift and handle the drain pan 14.

Figure 6:
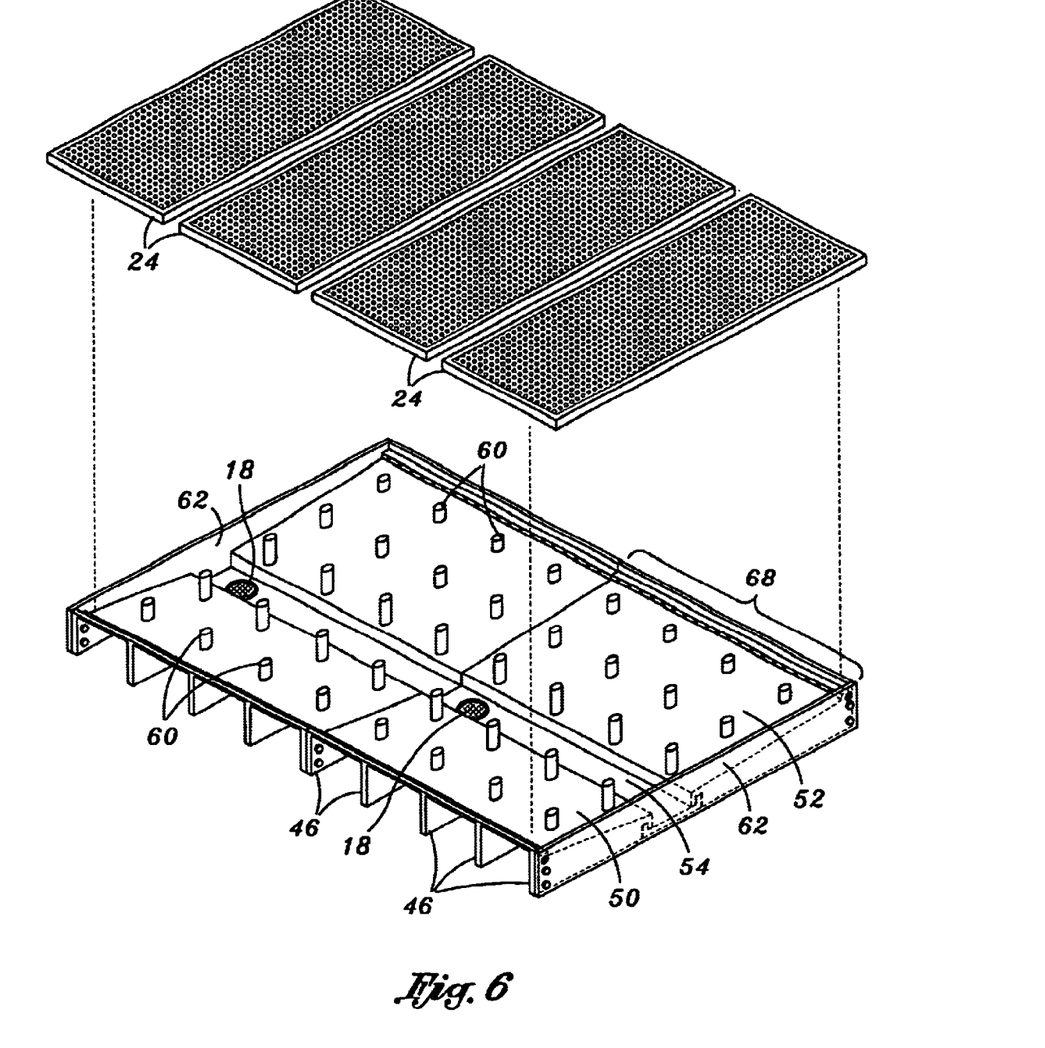
FIG. 6 is a perspective view of a second preferred embodiment of the flooring system illustrating the connective relationship of floor grids with horizontally adjacent drain pan sections that make up a drain pan assembly.
Figure 7:
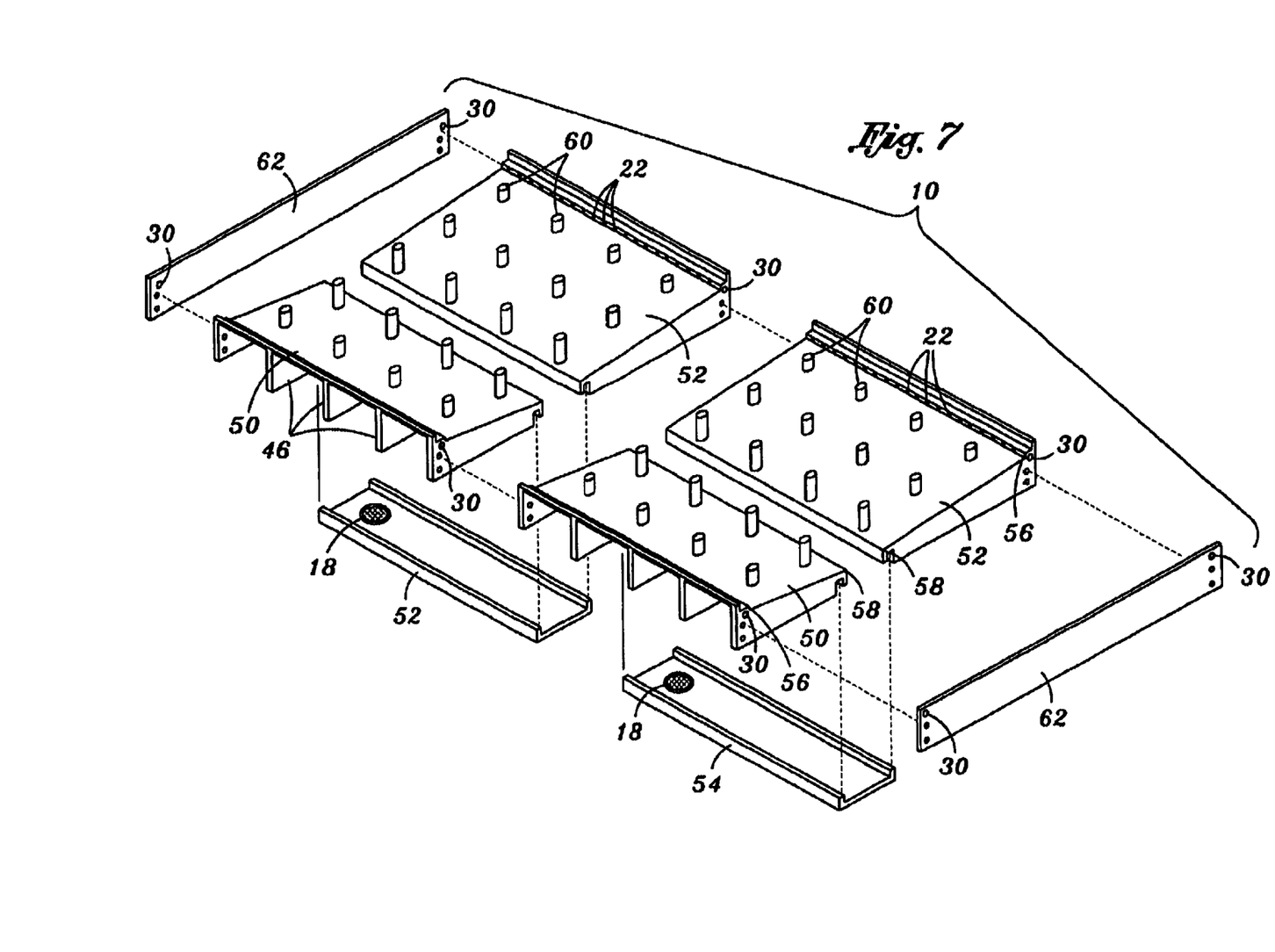
FIG. 7 is an exploded perspective view of the flooring system of FIG. 6 illustrating the connective relationship of a first and a second ramp section with a channel section that make up the drain pan section of the second preferred embodiment.

Turning now to FIGS. 6 and 7, shown is a second preferred embodiment of the self-cleaning flooring system 10 which allows for various size installations. FIG. 6 is a perspective view of the second preferred embodiment of the flooring system 10 illustrating the connective relationship of floor grids 24 with horizontally adjacent drain pan sections that make up a drain pan assembly 68. FIG. 7 is an exploded perspective view of the flooring system 10 of FIG. 6 illustrating the connective relationship of a first and a second ramp section 50, 52 with a channel section 54 that make up the drain pan section 66. The flooring system 10 has at least one drain pan assembly 68 comprised of the drain pan section 66 and at least one floor grid 24. The first and second ramp sections 50, 52 are each inclined with each ramp section 50, 52 defining upper and lower side portions 56, 58 thereof. The lower side portions 58 of the first and second ramp sections 50, 52 are interconnectable to the channel section 54, as can be seen in FIG. 7. The channel section 54 includes a drain outlet 18 which may be disposed anywhere along the length of the channel section 54. The upper side portions 56 of the first and second ramp sections 50, 52 have a plurality of discharge ports 22 spaced therealong for discharge of flushing fluid onto the first and second ramp sections 50, 52 such that the waste products are washed down the first and second ramp sections 50, 52 towards the channel section 54 and into the drain outlet 18. The first and second ramp sections 50, 52 may include fluid inlets 30 to allow flushing fluid to flow between adjacent drain pan sections 66, with the endmost drain pan section 66 connectable to the flushing fluid source at the fluid inlet 30. The fluid inlet 30 may be connected to a water supply wherein water is delivered to the hollow passage 28. The floor grid 24 extends between and is mounted upon the upper side portions 56 of the first and second ramp sections 50, 52. Similar to the floor grids 24 of the first preferred embodiment, the floor grids 24 of the second preferred embodiment are utilized for supporting personnel while permitting waste products to pass therethrough.

Similar to that shown in FIG. 2 for the first preferred embodiment, the first and second ramp sections 50, 52 shown in FIG. 6 may include a plurality of spaced floor grid supports 60 extending vertically therefrom for supporting the floor grid 24. The floor grid supports 60 extend up to a level equal to that of the upper side portions 56 of the first and second ramp sections 50, 52 for supporting the floor grid 24 at a constant height. The floor grids 24 of the second preferred embodiment may be formed as an array of spaced parallel grid members 34 joined together with transversely disposed spaced grid members 34. The spacing of the grid members 34 may be such that the interstices between crossing grid members 34 is fine enough to allow passage of semi-solid and liquid waste products as well as flushing fluid. The first and second ramp sections 50, 52 may further include parallel rib members 46 spaced along the length thereunder for supporting the drain pan section 66 on a sub-floor.

As shown in FIG. 6, the floor grids 24 are configured to be removable for cleaning. The floor grids 24 are also sized and configured so that the width of the floor grid 24 approximately matches the width of the drain pan. The floor grids 24 may be formed of metallic or polymeric material. If formed of metal, it is contemplated that the floor grids 24 may be formed of perforated stainless steel. If formed of a polymeric material, it is contemplated that the floor grids 24 may be formed of a fiber reinforced material. Regardless of the type of material or the manner of forming the floor grids 24, it will be understood that the floor grids 24 may be of any configuration suitable for supporting personnel and for allowing waste products to pass therethrough. Furthermore, the material used in fabricating the floor grids 24 may be one that is compatible with commercial dishwashers.

Although not shown in FIG. 6 or 7, the drain pan assembly 68 may further comprise an elongate channel stringer 44 sized to match the width of the channel section 54 and wherein the drain channel 40 is recessed below the lower side portions 58 of the first and second ramp sections 50, 52. The channel stringer 44 is disposed in alignment on the channel section 54. The channel stringer 44 is configured to retain waste products thereupon while allowing fluid to pass therethrough into the channel section 54. Regarding the material utilized to form the first and second ramp sections 50, 52 and the channel section 54, it is contemplated that polymeric material may be utilized. It is contemplated that the polymeric material may be polyvinylchloride and/or polypropylene and may be formed of injection molding, although any fabrication process may be utilized.

Although the drain pan assembly 68 of the second preferred embodiment may be of any size and shape in order to facilitate cleaning thereof, it is contemplated that the first ramp section 50 may be about twenty-four inches wide and the second ramp section 52 may be about thirty-six inches wide with the channel section 54 being about twelve inches wide. Furthermore, the length of the second ramp section 52 and the channel section 54 may be no more than thirty inches in one dimension such that the first and second ramp sections 50, 52 and the channel section 54 may be cleaned in a commercial conveyor type dishwasher having an entrance width of thirty inches. Accordingly, the floor grids 24 may be restricted to a maximum of thirty inches in one direction for accommodation within a commercial dishwasher of the conveyor type.

As can be seen in FIG. 6, each drain pan section 66 is configured to be connectable to adjacent drain pan sections 66 on either end thereof. The drain pan assembly 68 may include a plurality of dowels 36 disposed at the drain pan section 66 ends. The first and second ramp sections 50, 52 may include complimentary apertures 38 sized and configured for receiving the dowels 36 for interconnecting horizontally adjacent drain pan assemblies 68 in an end-to-end manner. It will be appreciated that any manner of interconnecting adjacent drain pan assemblies 68 may be utilized such as mechanical fasteners, keys or setting flanges. Furthermore, it is contemplated that a drain pan section 66 may be comprised of a pair of first ramp sections 50 connected to a channel section 54 or a pair of second ramp sections 52 connected to a channel section 54. In this manner, the drain pan assembly 68 may be provided in several widths. The floor grids 24 may be sized and configured to match the width of the assembled drain pan sections 66.

As shown in FIG. 7, the drain pan assembly 68 may further comprise at least one end plate 64 for sealing the drain pan section 66. In this regard, the flooring system 10 may be assembled and sealed by attaching an end plate 64 to the open ends of the endmost drain pan sections 66. Importantly, in floor configurations that do not allow for the installation of an even number of drain pan assemblies 68, individual first and second ramp sections 50, 52 and channel section 54 may be field cut to a shorter length than the standard drain pan section 66. The end plate 64 may then be attached to the shorter, field cut drain pan section 66 in order to complete the flooring system 10 of the second preferred embodiment.

In operation, in the first preferred embodiment, the desired number of drain pans 14 are arranged horizontally adjacent therewith and joined using dowels 36 or similar means described above. The fluid inlets 30 are connected to the flushing fluid source. Channel stringers 44 and drain baskets 64 are installed if provided. Floor grids 24 are then installed onto the drain pan. During use of the first preferred embodiment, the flushing fluid flows from the fluid inlets 30 into the hollow passages 28. As was previously mentioned, the flushing fluid may be provided on a periodic basis through the use of a timed control valve. Alternately, the flushing fluid may be manually provided as desired when the accumulation of waste products on the ramps 16 reaches a critical level. Additionally, a thermal sensor may operate to provide the flushing fluid to the fluid inlet 30 in the case of a fire. The flushing fluid may be in the form of water from a tap water source. In any case, the flushing fluid is discharged out of the discharge ports 22. If spray nozzles 32 are provided, the flushing fluid is discharged onto the ramps 16 at an elevated pressure. Waste products that fall through the floor grid 24 are then washed by the flushing fluid toward the drain channel 40. If a channel stringer 44 is provided, the waste products are restricted from passing into the drain channel 40. The flushing fluid then carries liquid waste products into the drain outlet 18. In configurations wherein a drain basket 64 is provided in the drain outlet 18, the drain basket 64 prevents solid or semi-solid waste products from passing through the drain outlet 18.

For cleaning, the floor grids 24 are individually removable from the module 12. The drain pan may be disconnected at the fluid inlets 30 from the source of flushing fluid. The drain pans 14 may then be disassembled from adjacent drain pans 14. The drain pans 14 may be further disassembled by removing the channel stringer 44 and drain basket 64 if provided. The spray nozzles 32 may also be removed. The drain pans 14, channel stringers 44, floor grids 24, and spray nozzles 32 may then be cleaned by hand or by mechanical means such as in a commercial dishwasher as mentioned above and then reassembled in a reverse order of assembly.

In the second preferred embodiment, the first and second ramp sections 50, 52 are joined to the channel sections 54 to form the desired number of drain pan sections 66. The drain pan sections 66 are arranged horizontally adjacent therewith and assembled using dowels 36 or similar means described above in the first preferred embodiment. The fluid inlets 30 are connected to the flushing fluid source, channel stringers 44 and drain baskets 64 are installed if provided and floor grids 24 are installed onto the drain pan assembly 68. The functioning of the second preferred embodiment is similar to that of the first preferred embodiment in that the flushing fluid flows from the fluid inlets 30 into the hollow passages 28. As was previously mentioned, the flushing fluid may be provided on a periodic basis through the use of a timed control valve. Alternately, the flushing fluid may be manually provided as desired when the accumulation of waste products on the ramps 16 reaches a critical level. Additionally, a thermal sensor may operate to provide the flushing fluid to the fluid inlet 30 in the case of a fire. The flushing fluid may be in the form of water from a tap water source with or without suitable cleaning agent additives. In any case, the flushing fluid is discharged out of the discharge ports 22. If spray nozzles 32 are provided, the flushing fluid is discharged onto the ramp sections 50, 52 at an elevated pressure. Waste products that fall through the floor grid 24 are then washed by the flushing fluid toward the drain channel 40. If a channel stringer 44 is provided, the waste products are restricted from passing into the drain channel 40. The flushing fluid then carries liquid waste products into the drain outlet 18. In configurations wherein a drain basket 64 is provided in the drain outlet 18, the drain basket 64 prevents solid or semi-solid waste products from passing through the drain outlet 18.

For cleaning, the floor grids 24 are removed, the drain pan assemblies 68 are disconnected at the fluid inlets 30 and disassembled from adjacent drain pan assemblies 68. The drain pan assemblies 68 may be further disassembled into first and second ramp sections 50, 52 and channel sections 54. The spray nozzles 32 may be removed along with any channel stringers 44 and drain baskets 64. The first and second ramp sections 50, 52, channel sections 54, channel stringers 44, floor grids 24, and spray nozzles 32 may then be cleaned in a manner similar to that descried for the first preferred embodiment. Reassembly of the second preferred embodiment is in reverse order of assembly.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A self-cleaning flooring system for catching waste products and having at least one module, the module comprising:

a drain pan having a ramp, a central drain outlet, at least one side wall and at least one end wall, the ramp being circumscribed by the side wall and the end wall, the side wall and the end wall defining a drain pan periphery, the side wall extending upwardly from the ramp, the ramp sloping downward towards the drain outlet;

a plurality of discharge ports spaced along the drain pan periphery for discharge of flushing fluid onto the ramp such that the waste products are washed down the ramp towards the drain outlet; and at least one floor grid extending across the drain pan and mounted upon the side wall for supporting personnel standing thereon while permitting waste products to pass therethrough;

wherein the side wall includes a hallow passage and at least one fluid inlet, the fluid inlet being in fluid communication with the hollow passage for delivering the flushing fluid to the discharge ports.

2. The module of claim 1 wherein the drain pan has a rectangular shape and the floor grid is sized to match the shape of the drain pan.

3. A self-cleaning flooring system for catching waste products and having at least one module, the module comprising:

a drain pan having a ramp, central drain outlet, at least one side wall and at least one end wall, the ramp being circumscribed by the side wall and the end wall, the side wall and end wall defining a drain pan periphery, the ramp sloping downward towards the drain outlet; and a plurality of discharge ports spaced along the drain pan periphery for discharge of flushing fluid onto the ramp such that the waste products are washed down the ramp towards the drain outlet;

at least one floor grid extending across the drain pan and mounted upon the drain pan periphery for supporting personnel standing thereon while permitting waste products to pass therethrough; and spray nozzles wherein the discharge ports are internally threaded for threadably mounting the spray nozzles therein.

4. The module of claim 1 wherein the drain pan is formed of polyvinylchloride material by injection molding as a unitary structure.

5. The module of claim 1 wherein the floor grid is formed of fiber reinforced material arranged in an array of spaced parallel grid members joined together with transversely disposed spaced grid members.

6. The module of claim 1 further comprising a plurality of dowels and wherein the side walls 26 include complimentary apertures sized and configured for receiving the dowels for interconnecting horizontally adjacent modules.

7. A self-cleaning flooring system for catching waste products and having at least one module, the module comprising:

a drain pan having a rectangular shape and including a drain channel, a pair of ramps, a pair of side walls and a pair of end walls, the ramps being disposed on either side of the drain channel and sloping downward from each side wall theretowards, the drain channel interposed between the side walls and extending between the end walls and including a central drain outlet, the drain channel sloping downward from each end wall towards the drain outlet, the side and end walls extending upwardly from the ramps and drain channel and enclosing the drain pan, each side wall having a plurality of discharge ports for releasing flushing fluid onto the ramp such that waste products are washed down the ramp towards the drain channel; and at least one floor grid extending between and mounted upon the side walls for supporting personnel standing thereon while permitting waste products to pass therethrough;

wherein the drain channel is recessed between each ramp and the drain pan further comprises an elongate channel stringer 44 disposed above the drain channel, the channel stringer 44 configured to retain waste products thereon while allowing fluid to pass therethrough into the drain channel.

8. The module of claim 7 wherein the span between the end walls defines a length of the module, and the floor grid comprises a plurality of abutting floor grids disposed parallel to each other and being sized such that the length of the module matches the overall length of the abutting floor grids.

9. The module of claim 7 wherein the span between the side walls defines a width of the module, and the drain pan includes a plurality of parallel rib members disposed widthwise thereunder for supporting the module.

10. The module of claim 8 wherein the width of the drain pan is no more than about 30 inches.

11. The module of claim 7 wherein the drain pan is formed of polyvinylchloride material by injection molding as a unitary structure.

12. The module of claim 7, wherein the floor grid is formed of perforated stainless steel.

13. A self-cleaning flooring system for catching waste products and having at least one module, the module comprising:

a drain pan having a rectangular shape and including a drain channel, a pair of ramps, a pair of side walls and a pair of end walls, the ramps being disposed on either side of the drain channel and sloping downward from each side wall theretowards, the drain channel interposed between the side walls and extending between the end walls and including a central drain outlet, the drain channel sloping downward from each end wall towards the drain outlet, the side and end walls extending upwardly from the ramps and drain channel and enclosing the drain pan, each side wall having a plurality of discharge ports for releasing flushing fluid onto the ramp such that waste products are washed down the ramp towards the drain channel;

at least one floor grid extending between and mounted upon the side walls for supporting personnel standing thereon while permitting waste products to pass therethrough; and a plurality of spray nozzles wherein the discharge ports are internally threaded for threadably mounting the spray nozzles therein.

14. A self-cleaning flooring system for catching waste products and having at least one module, the module comprising:

a drain pan having a rectangular shape and including a drain channel, a pair of ramps, a pair of side walls and a pair of end walls, the ramps being disposed on either side of the drain channel and sloping downward from each side wall theretowards, the drain channel interposed between the side walls and extending between the end walls and including a central drain outlet, the drain channel sloping downward from each end wall towards the drain outlet, the side and end walls extending upwardly from the ramps and drain channel and enclosing the drain pan, each side wall having a plurality of discharge ports for releasing flushing fluid onto the ramp such that waste products are washed down the ramp towards the drain channel; and at least one floor grid extending between and mounted upon the side walls for supporting personnel standing thereon while permitting waste products to pass therethrough;

wherein the side wall includes a hollow passage and at least one fluid inlet, the fluid inlet being in fluid communication with the hollow passage for delivering flushing fluid to the discharge ports, the end panels having at least one overflow passage disposed proximate the drain channel for allowing flushing fluid to flow between an adjacent module.

15. A self-cleaning flooring system for catching waste products and having at least one module, the module comprising:
   a drain pan having a rectangular shape and including a drain channel, a pair of ramps, a pair of side walls and a pair of end walls, the ramps being disposed on either side of the drain channel and sloping downward from each side wall theretowards, the drain channel interposed between the side walls and extending between the end walls and including a central drain outlet, the drain channel sloping downward from each end wall towards the drain outlet, the side and end walls extending upwardly from the ramps and drain channel and enclosing the drain pan, each side wall having a plurality of discharge ports for releasing flushing fluid onto the ramp such that waste products are washed down the ramp towards the drain channel;
   at least one floor grid extending between and mounted upon the side walls for supporting personnel standing thereon while permitting waste products to pass therethrough; and
   a plurality of dowels wherein the side walls and end walls include complimentary apertures sized and configured for receiving the dowels for interconnecting horizontally adjacent modules.

16. A self-cleaning flooring system for catching waste products and having at least one drain pan assembly, the drain pan assembly comprising:
   a drain pan section including a first ramp section, a second ramp section, and a channel section, the first and second ramp sections being inclined and each defining upper and lower side portions, the lower side portions of first and second ramp sections being interconnectable to the channel section, the channel section including a drain outlet, the upper side portions having a plurality of discharge ports spaced therealong for discharge of flushing fluid onto the ramp such that the waste products are washed down the first and second ramp sections towards the channel section and into the drain outlet;
   at least one floor grid extending between and mounted upon the upper side portions of the first and second ramp sections for supporting personnel standing thereon while permitting waste products to pass therethrough; and
   an elongate channel stringer 44 sized to match the width of the channel section and wherein the drain channel is recessed below the lower side portions of the first and second ramp sections and the channel stringer 44 is disposed in alignment thereon, the channel stringer 44 configured to retain waste products thereupon while allowing fluid to pass therethrough into the channel section.

17. The drain pan assembly of claim 16 wherein the first and second ramp sections include a plurality of spaced floor grid supports extending vertically therefrom for supporting the floor grid.

18. The drain pan assembly of claim 16 wherein the drain pan section is connectable to adjacent drain sections on either end thereof.

19. The drain pan assembly of claim 16 further comprising at least one end plate for sealing the drain pan section against the end plate.

20. The drain pan assembly of claim 16 wherein the first pan section is about 24 inches wide, the second pan section is about 36 inches wide, the channel section is about 12 inches wide and the length of the second pan and channel sections is no more than 30 inches.

21. The drain pan assembly of claim 16 wherein the first and second pan sections and channel section are injection molded into separate articles of polymer material.

22. A self-cleaning flooring system having at least one module, the module comprising:
   a. a drain pan having a ramp and a drain outlet, the ram sloping downward towards the drain outlet; and
   b. a plurality of discharge ports disposed about a periphery of the drain pan, the discharge port being directed towards the drain outlet to direct flushing fluid towards the drain outlet;
wherein the discharge ports are internally threaded for threadably mounting the spray nozzles therein.

23. A self-cleaning flooring system having at least one module, the module comprising:
   a. a drain pan having a ramp and a drain outlet, the ramp sloping downward towards the drain outlet; and
   b. a plurality of discharge ports disposed about a periphery of the drain pan, the discharge port being directed towards the drain outlet to direct flushing fluid towards the drain outlet; and
   c. a plurality of dowels, at least one side wall circumscribed about a portion of the drain pan, and wherein the sidewall include complimentary apertures sized and configured to receive the dowels for interconnecting horizontally adjacent modules.

24. A self-cleaning flooring system having at least one module, the module comprising:
   a. a drain pan having a ramp and a drain outlet, the ramp sloping downward towards the drain outlet;
   b. a plurality of discharge ports disposed about a periphery of the drain pan, the discharge port being directed towards the drain outlet to direct flushing fluid towards the drain outlet;
   a drain channel recessed within the ramp; and
   an elongate channel stringer disposed above the drain channel, the stringer configured to retain waste products thereon while allowing fluid to pass therethrough into the drain channel.

25. A self-cleaning flooring system having at least one module, the module comprising:
   a. a drain pan having a ramp and a drain outlet, the ramp sloping downward towards the drain outlet:
   b. a plurality of discharge ports disposed about a periphery of the drain pan, the discharge port being directed towards the drain outlet to direct flushing fluid towards the drain outlet; and
   c. at least one side wall circumscribed about a portion of the periphery of the drain pan, the side wall including a hollow passage and at least one fluid inlet, the fluid inlet being in fluid communication with the hollow passage for delivering flushing fluid to the discharge ports.

26. A self-cleaning flooring system having at least one module, the module comprising:
   a. a drain pan having a ramp and a drain outlet, the ramp sloping downward towards the drain outlet; and
   b. a plurality of discharge ports disposed about a periphery of the drain pan, the discharge port having a fluid pressurizable side and an output side, the output side of the discharge port being directed toward the drain outlet.

27. The module of claim 26 further comprising a plurality of spray nozzles engageable to the discharge ports.

28. A self-cleaning flooring system having at least one module, the module comprising:

a. a drain pan having a ramp and a drain outlet, the ramp sloping downward towards the drain outlet;

b. at least one side wall circumscribed about at least portion of a periphery of the drain pan;

c. a plurality of discharge ports disposed within the sidewall for discharging flushing fluid onto the ramp such that waste products are washed down the ramp towards the drain outlet; and     d. a plurality of spray nozzles engageable to the discharge ports.

\* \* \* \* \*